US012611654B2

(12) United States Patent
Weng et al.

(10) Patent No.: US 12,611,654 B2
(45) Date of Patent: Apr. 28, 2026

(54) HIGHLY CHLORINE- AND WATER-RESISTANT CATALYST, PREPARATION METHOD THEREFOR AND USE THEREOF

(71) Applicant: ZHEJIANG UNIVERSITY, Hangzhou (CN)

(72) Inventors: Xiaole Weng, Hangzhou (CN); Yunpeng Long, Hangzhou (CN); Meiling Chen, Hangzhou (CN); Zhongbiao Wu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 595 days.

(21) Appl. No.: 18/150,804

(22) Filed: Jan. 6, 2023

(65) Prior Publication Data

US 2023/0211322 A1 Jul. 6, 2023

(30) Foreign Application Priority Data

Jan. 6, 2022 (CN) .......................... 202210011307.6

(51) Int. Cl.
| | |
|---|---|
| *B01J 37/08* | (2006.01) |
| *B01D 53/86* | (2006.01) |
| *B01J 23/14* | (2006.01) |
| *B01J 23/28* | (2006.01) |
| *B01J 23/46* | (2006.01) |
| *B01J 35/30* | (2024.01) |
| *B01J 35/45* | (2024.01) |
| *B01J 35/70* | (2024.01) |

(Continued)

(52) U.S. Cl.
CPC ........ *B01J 23/462* (2013.01); *B01D 53/8668* (2013.01); *B01J 23/14* (2013.01); *B01J 23/28* (2013.01); *B01J 35/393* (2024.01); *B01J*
35/394 (2024.01); *B01J 35/45* (2024.01); *B01J 35/70* (2024.01); *B01J 37/0215* (2013.01); *B01J 37/04* (2013.01); *B01J 37/08* (2013.01); *B01J 37/16* (2013.01); *B01D 2255/1026* (2013.01); *B01D 2257/708* (2013.01); *B01J 2235/00* (2024.01); *B01J 2235/15* (2024.01); *B01J 2235/30* (2024.01)

(58) Field of Classification Search
None
See application file for complete search history.

(56) References Cited

FOREIGN PATENT DOCUMENTS

| | | |
|---|---|---|
| CN | 102698751 A | 10/2012 |
| CN | 107670658 A | 2/2018 |
| CN | 110404534 A | 11/2019 |
| CN | 110479317 A | 11/2019 |

(Continued)

OTHER PUBLICATIONS

Machine translation of Dai et al., Cn 102698751A (Year: 2012).*

(Continued)

*Primary Examiner* — Keling Zhang
(74) *Attorney, Agent, or Firm* — Bayramoglu Law Offices LLC

(57) ABSTRACT

A preparation method for a highly chlorine- and water-resistant catalyst is provided. A mixture of at least one of $SnO_2$, $GeO_2$, and $MoO_2$ with $CeO_2$ is used as a catalyst support, face-centered cubic ruthenium oxide is used as an active component, and the catalyst with excellent chlorine- and water-resistance is prepared through selective adsorption regulation, which can realize safe and efficient purification of chlorine-containing organic waste gas at temperatures below 250° C.

6 Claims, 3 Drawing Sheets

(51) Int. Cl.
    *B01J 37/02*         (2006.01)
    *B01J 37/04*         (2006.01)
    *B01J 37/16*         (2006.01)

(56)                  References Cited

FOREIGN PATENT DOCUMENTS

| CN | 113731409 | A | 12/2021 |
| WO | 2021198479 | A1 | 10/2021 |

OTHER PUBLICATIONS

Liu et al., Insight into the improvement effect of the Ce doping into the SnO2 catalyst for the catalytic combustion of methane, Applied Catalysis B: Environmental, 2015 (Liu) (Year: 2015).*

Kusada et al., Discovery of face-centered-cubic ruthenium nanoparticles: Facile size-controlled synthesis using the chemical reaction method, Journal of the American Chemical Society, 2013 (Year: 2013).*

Zamar et al., The direct room-temperature synthesis of CeO2-based solid solutions: a novel route to catalysts with a high oxygen storage/transport capacity, Studies in Surface Science and Catalysis, 1996 (Year: 1996).*

Dai Qiguang, et al., Low-temperature catalytic combustion of chlorinated volatile organic compounds over CeO2-based catalysts—from high activity to high stability and high selectivity, Industrial Catalysis, 2020, pp. 1-15, vol. 28, No. 4.

Liang Wenjun, et al., Effect of Ce doping on catalytic chlorobenzene performance of Ru/TiO2 catalysts, CIESC Journal, 2020, pp. 3585-3593, vol. 71, No. 8.

* cited by examiner

HIGHLY CHLORINE- AND WATER-RESISTANT CATALYST, PREPARATION METHOD THEREFOR AND USE THEREOF

CROSS REFERENCE TO THE RELATED APPLICATIONS

This application is based upon and claims priority to Chinese Patent Application No. 202210011307.6, filed on Jan. 6, 2022, the entire contents of which are incorporated herein by reference.

TECHNICAL FIELD

The present invention relates to the technical field of catalysts, and in particular to a highly chlorine- and water-resistant catalyst, a preparation method therefor and use thereof.

BACKGROUND

Chlorine-containing volatile organic compounds (Cl-VOCs) originate from organic solvents, pesticides, intermediates of chemical products, chlor-alkali industry and the like in industrial applications. They enter the environment through volatilization and other routes, seriously harming the environment and human health. At present, the main treatment methods for Cl-VOCs are end-of-pipe control measures for pollutants. The catalytic combustion technology in the end-of-pipe treatment techniques for Cl-VOCs has the advantages of wide application range, low energy consumption and the like.

However, catalysts for catalytic combustion of Cl-VOCs are prone to cause chlorine poisoning, and have poor low-temperature water-resistance. They can work stably only at temperatures above 250° C., making it difficult to avoid the formation temperature range (250-450° C.) of dioxins. A Chinese patent with publication No. CN110404534A discloses a high-efficiency anti-chlorine poisoning catalyst for the catalytic oxidation of a volatile organic compound and a preparation method therefor, wherein the catalyst uses $RuO_2$ as an active component and a mixed metal oxide, $Sn_yTi_{1-y}O_2$ or $MO_x$—$Sn_yTi_{1-y}O_2$, as a support, and the catalyst features high catalytic activity on chlorine-containing volatile organic compounds, strong chlorine poisoning-resistance, high selectivity to $CO_2$ and the like, but has the problems such as high operating temperature and the like. Therefore, how to reduce the service temperature of catalysts and improve their chlorine- and water-resistance has become an urgent problem to be solved in this field.

SUMMARY

The present invention is intended to provide a chlorine- and water-resistant catalyst, a preparation method therefor and use thereof. The catalyst prepared according to the present invention has good chlorine- and water-resistance, can realize complete catalytic oxidation of various volatile organic compounds and chlorine-containing volatile organic compounds at temperatures below 250° C., and can maintain long-term stability and good water-resistance stability.

In order to achieve the above objective, the present invention provides the following technical solutions.

The present invention provides a preparation method for a chlorine- and water-resistant catalyst, comprising the following steps:

(1) mixing $MO_x$ with $CeO_2$ to obtain a $MO_xCeO_2$ support, wherein $MO_x$ is at least one of $SnO_2$, $GeO_2$ and $MoO_2$;

(2) mixing ruthenium acetylacetonate, a reductant and a stabilizer, and carrying out a reduction reaction to obtain FCC $RuO_x$;

(3) mixing the $MO_xCeO_2$ support obtained in step (1) with $RuO_x$ obtained in step (2) and water, and carrying out supporting at a certain pH to obtain a catalyst precursor; and (4) calcining the catalyst precursor obtained in step (3) to obtain a chlorine- and water-resistant catalyst;

wherein step (1) and step (2) have no order of priority.

Preferably, in step (1), the mixing is ball-milling, and the ball-milling is carried out at a rotation speed of 200-500 r/min for 6-24 h.

Preferably, in step (1), $MO_x$ is 5-40% by mass of the $MO_xCeO_2$ support.

Preferably, in step (2), the reduction reaction is carried out at a temperature of 160-200° C. for 1-3 h, and $RuO_x$ has a particle size of 0.4-8 nm.

Preferably, in step (3), the mass of Ru in $RuO_x$ is 0.01-2% of the mass of the $MO_xCeO_2$ support.

Preferably, in step (3), the pH is determined by an isoelectric point of the support such that $RuO_x$ has a strong interaction with $MO_x$ rather than $CeO_2$, and the supporting is carried out at a temperature of 40-60° C. for 1-6 h.

Preferably, in step (3), the supporting is carried out at a temperature of 40-60° C. for 1-6 h.

Preferably, in step (4), the calcining is carried out at a temperature of 300-450° C. for 2-6 h.

The present invention further provides a highly chlorine- and water-resistant catalyst prepared by the preparation method described in the above technical solutions.

The present invention further provides use of the chlorine- and water-resistant catalyst described in the above technical solutions in treating a chlorine-containing volatile organic compound.

DETAILED DESCRIPTION OF THE EMBODIMENTS

Figure 1:
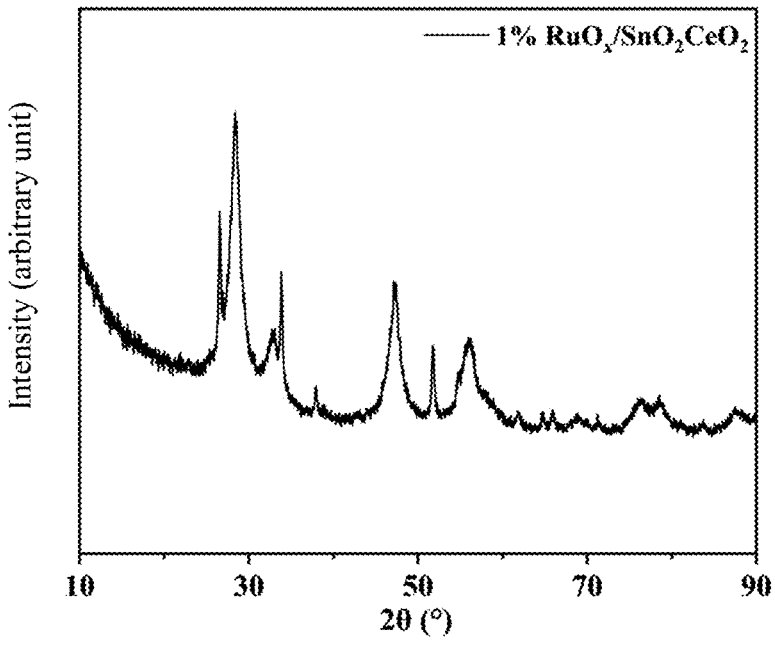
FIG. 1 is an XRD pattern of $RuO_x/SnO_2CeO_2$ prepared in Example 1.

The present invention provides a preparation method for a chlorine- and water-resistant catalyst, comprising the following steps:

(1) mixing $MO_x$ with $CeO_2$ to obtain a $MO_xCeO_2$ support, wherein $MO_x$ is at least one of $SnO_2$, $GeO_2$ and $MoO_2$;

(2) mixing ruthenium acetylacetonate, a reductant and a stabilizer, and carrying out a reduction reaction to obtain FCC $RuO_x$;

(3) mixing the $MO_xCeO_2$ support obtained in step (1) with $RuO_x$ obtained in step (2) and water, and carrying out supporting at a certain pH to obtain a catalyst precursor; and (4) calcining the catalyst precursor obtained in step (3) to obtain a chlorine- and water-resistant catalyst;

wherein step (1) and step (2) have no order of priority.

In the present invention, $MO_x$ is mixed with $CeO_2$ to obtain a $MO_xCeO_2$ support.

In the present invention, $MO_x$ is at least one of $SnO_2$, $GeO_2$ and $MoO_2$, and $MO_x$ is preferably rutile-type. In the present invention, $MO_xCeO_2$ is a support material of the catalyst and is used for supporting ruthenium oxide.

In the present invention, the mixing is preferably ball-milling, the ball-milling is preferably carried out at a rotation speed of 200-500 r/min, and the ball-milling is preferably carried out for 6-24 h.

In the present invention, in step (1), $MO_x$ is preferably 5-40%, and more preferably 10-15%, by mass of the $MO_x$-$CeO_2$ support.

In the present invention, ruthenium acetylacetonate, a reductant and a stabilizer are mixed, and a reduction reaction is carried out to obtain FCC $RuO_x$. In the present invention, ruthenium oxide $RuO_x$ with a face-centered cubic structure is prepared by solvent reduction method using ruthenium acetylacetonate as a precursor of an active component Ru in the presence of a reductant and a stabilizer.

In the present invention, the reductant is preferably triethylene glycol (TEG), and the stabilizer is preferably polyvinylpyrrolidone (PVP). In the present invention, ruthenium acetylacetonate is used as a precursor of an active component Ru, and the stabilizer is used for preventing the aggregation of nanoparticles and thus achieving the effect of stabilizing the reaction system.

In the present invention, the reductant and ruthenium acetylacetonate are preferably in a molar ratio of (20-1000):1; the stabilizer and ruthenium acetylacetonate are preferably in a molar ratio of (0.1-20):1.

In the present invention, the reduction reaction is preferably carried out at a temperature of 160-200° C., and the reduction reaction is preferably carried out for 1-3 h.

In the present invention, after the reduction reaction is completed, the product obtained by the reduction reaction is preferably subject to separation and washing sequentially to obtain $RuO_x$.

In the present invention, the separation is preferably centrifugal separation, and a solvent used for the washing is preferably acetone or toluene. In the present invention, operations of the separation are not particularly limited, and any operation known to those skilled in the art can be used.

In the present invention, $RuO_x$ preferably has a particle size of 0.4-8 nm. In the present invention, controlling the particle size of $RuO_x$ can further improve the dispersibility and catalytic activity of the active component, thereby further improving the chlorine- and water-resistance of the catalyst.

In the present invention, after the $MO_xCeO_2$ support and $RuO_x$ are obtained, the $MO_xCeO_2$ support is mixed with $RuO_x$ and water, and supporting is carried out at a certain pH to obtain a catalyst precursor. In the present invention, during the supporting, the surface of $MO_x$ in the support is negatively charged due to the deprotonation reaction of hydroxyl groups, the surface of $RuO_x$ is positively charged due to the protonation reaction of hydroxyl groups, and the surface of $CeO_2$ in the support is positively charged due to the protonation reaction of hydroxyl groups, so that $RuO_x$ is preferentially and selectively adsorbed on $MO_x$ in the support under electrostatic interaction, and a small part of $RuO_x$ is adsorbed on $CeO_2$ in the support under weak interaction; when $MO_x$ is in the rutile crystal form, under strong electrostatic interaction, $RuO_x$ shows good dispersibility on $MO_x$ due to the similar unit cell parameters.

In the present invention, the mass of Ru in $RuO_x$ is preferably 0.01-2% of the mass of the $MO_xCeO_2$ support. In the present invention, by controlling the mass of $RuO_x$, the low-temperature chlorine-resistance of the catalyst can be further improved. In the present invention, the amount of water used is not particularly limited as long as full mixing of the support and $RuO_x$ can be ensured.

In the present invention, the supporting is preferably carried out at a temperature of 40-60° C.; the supporting is preferably carried out for 1-6 h; the pH of the solution during the supporting is preferably between an isoelectric point of $MO_x$ and an isoelectric point of $RuO_x$; when $MO_x$ is $SnO_2$, the pH is preferably 5-6; and the pH is preferably adjusted with a hydrochloric acid solution or a sodium hydroxide solution. In the present invention, by controlling the pH of the solution during the supporting, the most beneficial supporting effect is achieved.

In the present invention, after the supporting is completed, the product obtained by the supporting is preferably dried to obtain a catalyst precursor. In the present invention, operations of the drying are not particularly limited as long as the product is dried to a constant weight.

In the present invention, after the catalyst precursor is obtained, the catalyst precursor is calcined to obtain a chlorine- and water-resistant catalyst.

In the present invention, the calcining is preferably carried out at a temperature of 300-450° C.; and the calcining is preferably carried out for 2-6 h.

In the present invention, FCC $RuO_x$ is preferentially and selectively adsorbed on $MO_x$ of the $MO_xCeO_2$ support, which provides good chlorine poisoning-resistance, water-resistance and oxidation performance, and can be used for treating industrial organic waste gas containing chlorine-containing volatile organic compounds with high dechlorination efficiency and long catalytic life; the prepared catalyst can realize complete catalytic oxidation of various volatile organic compounds and chlorine-containing volatile organic compounds at temperatures below 250° C., and can maintain long-term water-resistance stability.

The present invention further provides a chlorine- and water-resistant catalyst prepared by the preparation method described in the above technical solutions.

In the present invention, the active component of the chlorine- and water-resistant catalyst is FCC $RuO_x$, the support is $MO_xCeO_2$, and the catalyst features high activity, strong chlorine-resistance, strong water-resistance and the like, and can be widely used in the catalytic combustion treatment of chlorine-containing volatile organic compounds.

The present invention further provides use of the chlorine- and water-resistant catalyst described in the above technical solutions in treating a chlorine-containing volatile organic compound.

The technical solutions in the present invention will be clearly and completely described below with reference to the examples in the present invention. It is apparent that the described examples are only a part of the examples of the present invention, but not all of them. Based on the examples of the present invention, all other examples obtained by those of ordinary skill in the art without creative effort shall fall within the protection scope of the present invention.

Example 1

The preparation of the chlorine- and water-resistant catalyst was conducted as follows:

(1) Rutile-type $SnO_2$ and $CeO_2$ nanorods in a mass ratio of 1:9 were ball-milled at a rotation speed of 300 r/min for 12 h to obtain a $SnO_2CeO_2$ support.

(2) Ruthenium acetylacetonate, TEG and PVP were mixed, and a reduction reaction was carried out in an oil bath at 185° C. for 3 h, followed by centrifugal separation and washing with acetone to obtain FCC $RuO_x$ with a size of 2.3 nm; wherein TEG and ruthenium acetylacetonate were in a molar ratio of 200:1; PVP and ruthenium acetylacetonate were in a molar ratio of 5:1.

(3) The $SnO_2CeO_2$ support obtained in step (1) was mixed with $RuO_x$ obtained in step (2) and water, the resulting mixture was stirred at 50° C. for 2 h for supporting, and then dried to obtain a catalyst precursor; wherein the pH of the solution during the supporting was 6, and the mass of Ru in $RuO_x$ was 1% of the mass of the $SnO_2CeO_2$ support.

(4) The catalyst precursor obtained in step (3) was calcined at 350° C. for 4 h to obtain a $RuO_x/SnO_2CeO_2$ chlorine- and water-resistant catalyst.

Figure 2:
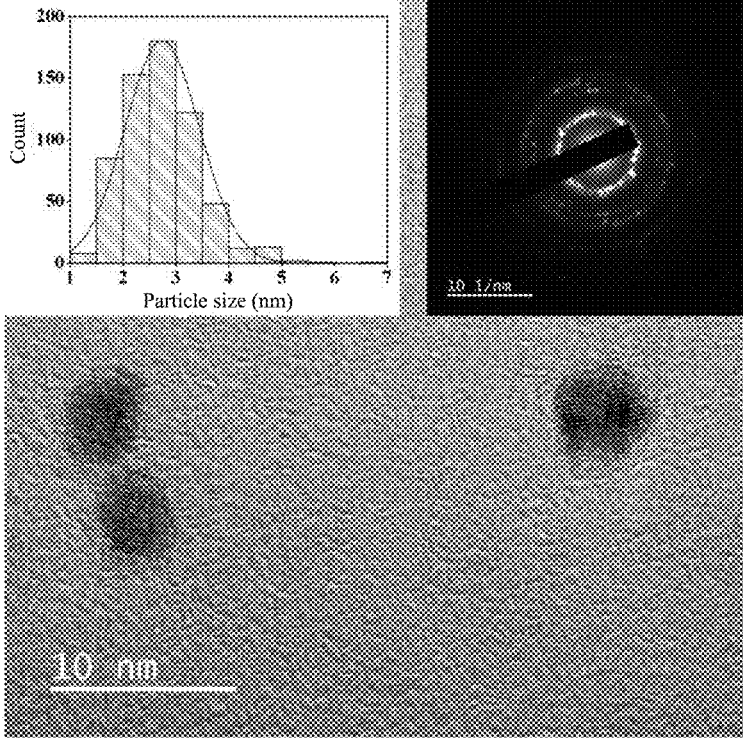
FIG. 2 is an HR-TEM image of FCC $RuO_x$ in Example 1.

The XRD pattern of $RuO_x/SnO_2CeO_2$ prepared in Example 1 is shown in FIG. 1, and the TEM image of $RuO_x$ in Example 1 is shown in FIG. 2. It can be seen from FIG. 2 that $RuO_x$ was in a face-centered cubic structure and had a size of 2.3 nm.

Figure 3:
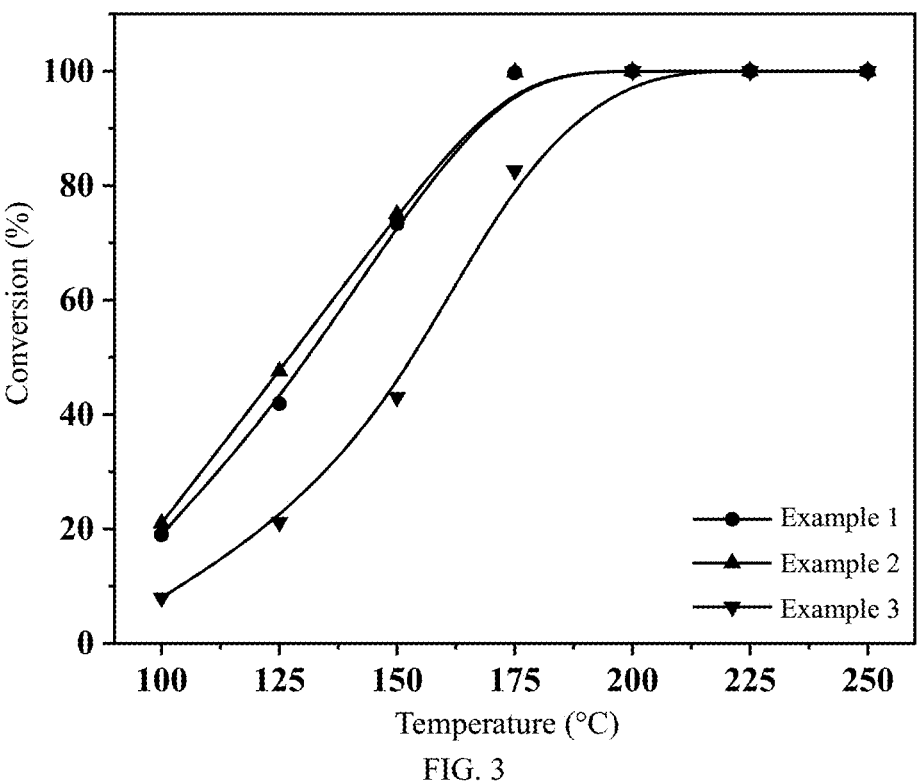
FIG. 3 is a graph showing the catalytic activity of the catalysts prepared in Examples 1-3.
Figure 4:
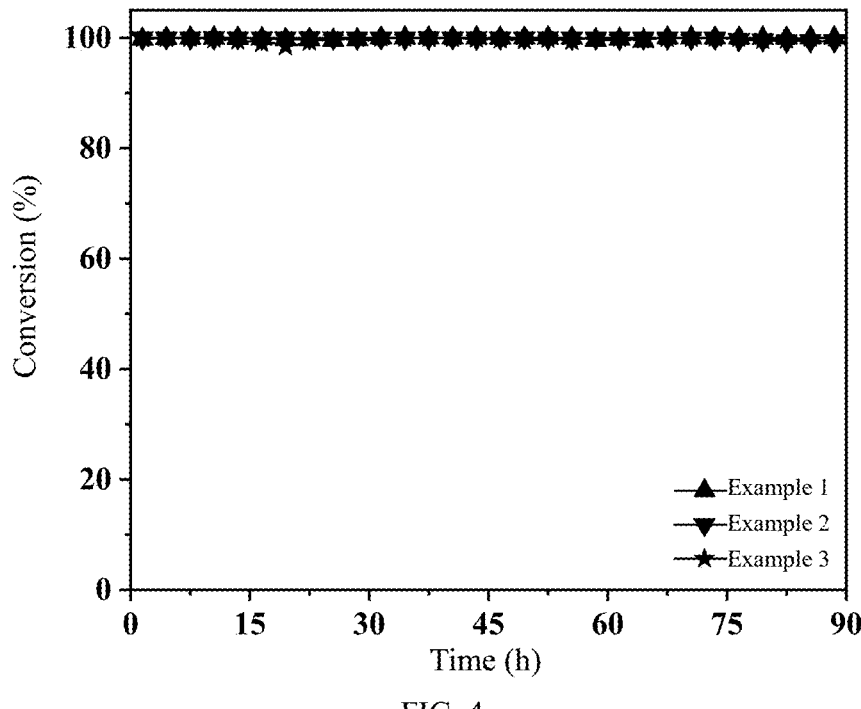
FIG. 4 is a graph showing the stability of the catalysts prepared in Examples 1-3.
Figure 5:
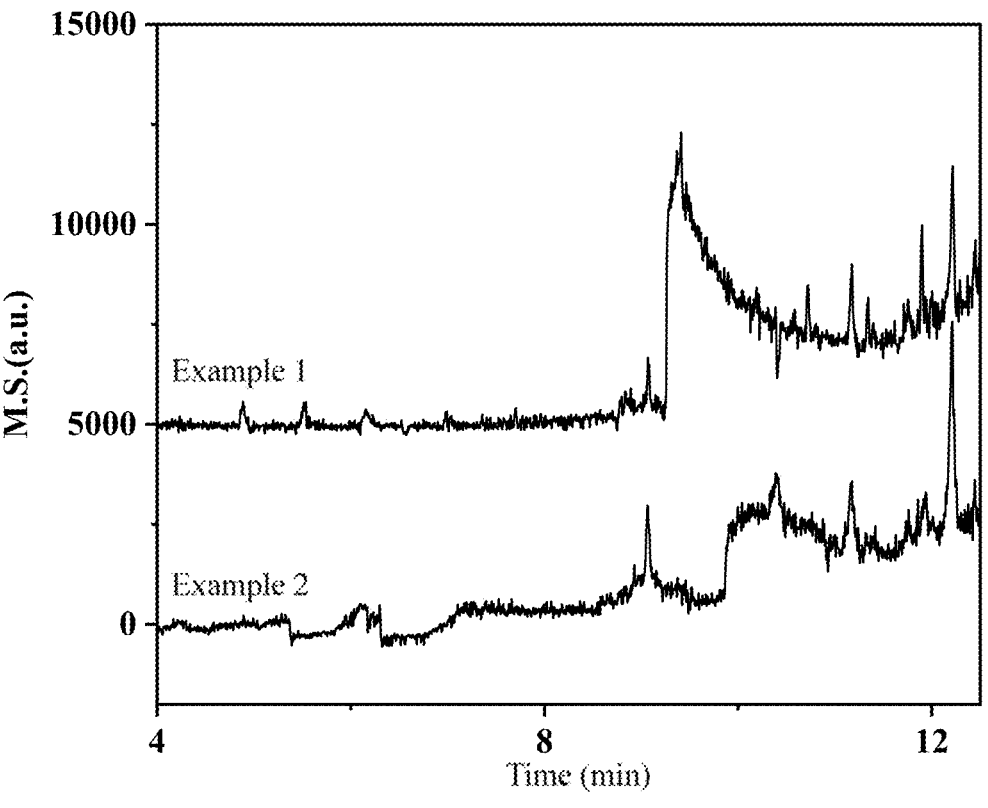
FIG. 5 is a GC/MS pattern of by-products of the catalysts prepared in Examples 1-2.

The catalytic activity test of the chlorine- and water-resistant catalyst prepared in Example 1 was carried out on a fixed bed reactor, the loading amount of the catalyst was 1.0 g, the granularity was 40-60 mesh, and the initial gas concentrations were as follows: chlorobenzene=500 ppm, $[O_2]$=10 vol %, $N_2$ as a carrier gas, gas hourly space velocity (GHSV)=10000 $h^{-1}$-. The reaction temperature for the test was 100-250° C., the results are shown in FIG. 3, the stability is shown in FIG. 4, and the GC/MS test results of the by-products are shown in FIG. 5.

Example 2

The preparation of the chlorine- and water-resistant catalyst was conducted as follows.

(1) Rutile-type $SnO_2$ and $CeO_2$ nanorods in a mass ratio of 1:4 were ball-milled at a rotation speed of 300 r/min for 24 h to obtain a $SnO_2CeO_2$ support.

(2) Ruthenium acetylacetonate, TEG and PVP were mixed, and a reduction reaction was carried out in an oil bath at 185° C. for 3 h, followed by centrifugal separation and washing with acetone to obtain FCC $RuO_x$ with a size of 2.3 nm; wherein TEG and ruthenium acetylacetonate were in a molar ratio of 200:1; PVP and ruthenium acetylacetonate were in a molar ratio of 5:1.

(3) The $SnO_2CeO_2$ support obtained in step (1) was mixed with $RuO_x$ obtained in step (2) and water, the resulting mixture was stirred at 50° C. for 2 h for supporting, and then dried to obtain a catalyst precursor; wherein the pH of the solution during the supporting was 5.5, and the mass of Ru in $RuO_x$ was 1% of the mass of the $SnO_2CeO_2$ support.

(4) The catalyst precursor obtained in step (3) was calcined at 400° C. for 4 h to obtain a $RuO_x/SnO_2CeO_2$ chlorine- and water-resistant catalyst.

The catalytic activity test of the chlorine- and water-resistant catalyst prepared in Example 2 was carried out on a fixed bed reactor, the loading amount of the catalyst was 1.0 g, the granularity was 40-60 mesh, and the initial gas concentrations were as follows: chlorobenzene=1000 ppm, $[O_2]$=10 vol %, $[H_2O]$=5 vol %, $N_2$ as a carrier gas, GHSV=10000 $h^{-1}$. The reaction temperature for the test was 100-250° C., the results are shown in FIG. 3, the stability is shown in FIG. 4, and the GC/MS test results of the by-products are shown in FIG. 5.

Example 3

The preparation of the chlorine- and water-resistant catalyst was conducted as follows.

(1) Rutile-type $MoO_2$ and $CeO_2$ nanospheres in a mass ratio of 1:9 were ball-milled at a rotation speed of 500 r/min for 6 h to obtain a $MoO_2CeO_2$ support.

(2) Ruthenium acetylacetonate, TEG and PVP were mixed, and a reduction reaction was carried out in an oil bath at 200° C. for 2 h, followed by centrifugal separation and washing with acetone to obtain FCC $RuO_x$ with a size of 3.5 nm; wherein TEG and ruthenium acetylacetonate were in a molar ratio of 100:1; PVP and ruthenium acetylacetonate were in a molar ratio of 5:1.

(3) The $MoO_2CeO_2$ support obtained in step (1) was mixed with $RuO_x$ obtained in step (2) and water, the resulting mixture was stirred at 50° C. for 2 h for supporting, and then dried to obtain a catalyst precursor; wherein the pH of the solution during the supporting was 5.5, and the mass of Ru in $RuO_x$ was 2% of the mass of the $MoO_2CeO_2$ support.

(4) The catalyst precursor obtained in step (3) was calcined at 350° C. for 4 h to obtain a $RuO_x/MoO_2CeO_2$ chlorine- and water-resistant catalyst.

The catalytic activity test of the chlorine- and water-resistant catalyst prepared in Example 3 was carried out on a fixed bed reactor, the loading amount of the catalyst was 1.0 g, the granularity was 40-60 mesh, and the initial gas concentrations were as follows: dichloromethane=1000 ppm, $[O_2]$=10 vol %, $[H_2O]$=5 vol %, $N_2$ as a carrier gas, GHSV=20000 $h^{-1}$. The reaction temperature for the test was 100-250° C., the results are shown in FIG. 3, and the stability is shown in FIG. 4.

It can be seen from FIGS. 3 and 4 that the catalysts prepared in Examples 1-3 could realize complete catalytic oxidation of various chlorine-containing volatile organic compounds at temperatures below 250° C., and could maintain long-term stability and good water-resistance stability.

It can be seen from FIG. 5 that the catalysts prepared in Examples 1-2 showed good formation of by-products when tested at 250° C.

The above descriptions are only preferred embodiments of the present invention. It should be noted that those of ordinary skill in the art can also make several improvements and modifications without departing from the principle of the present invention, and such improvements and modifications shall fall within the protection scope of the present invention.

What is claimed is:

1. A preparation method for a highly chlorine- and water-resistant catalyst, comprising the following steps:

(1) mixing $MO_2$ with $CeO_2$ to obtain a $MO_2CeO_2$ support, wherein the $MO_2$ is at least one of $SnO_2$, $GeO_2$, and $MoO_2$;

(2) mixing ruthenium acetylacetonate, a reductant, and a stabilizer to obtain a first mixture, and carrying out a reduction reaction on the first mixture to obtain face-centered cubic (FCC) $RuO_x$;

(3) mixing the $MO_2CeO_2$ support obtained in step (1) with the FCC $RuO_x$ obtained in step (2) and water to obtain a second mixture, and carrying out supporting on the second mixture at a predetermined pH to obtain a catalyst precursor; and (4) calcining the catalyst precursor obtained in step (3) to obtain the highly chlorine- and water-resistant catalyst;

wherein step (1) and step (2) have no order of priority; in step (3), the predetermined pH is determined by an isoelectric point of the $MO_2CeO_2$ support such that the FCC $RuO_x$ has a stronger interaction with the $MO_2$ rather than the $CeO_2$, and the supporting is carried out at a temperature of 40-60° C. for 1-6 h;

wherein x in $RuO_x$ is a positive value.

2. The preparation method according to claim 1, wherein in step (1), the mixing is ball-milling, and the ball-milling is carried out at a rotation speed of 200-500 r/min for 6-24 h.

3. The preparation method according to claim 1, wherein in step (1), the $MO_2$ is 5-40% by mass of the $MO_2CeO_2$ support.

4. The preparation method according to claim 1, wherein in step (2), the reduction reaction is carried out at a temperature of 160-200° C. for 1-3 h, and the FCC $RuO_x$ has a particle size of 0.4-8 nm.

5. The preparation method according to claim 1, wherein in step (3), a mass of Ru in the FCC $RuO_x$ is 0.01-2% of a mass of the $MO_2CeO_2$ support.

6. The preparation method according to claim 1, wherein in step (4), the calcining is carried out at a temperature of 300-450° C. for 2-6 h.

\* \* \* \* \*